(12) United States Patent
Banwaitt et al.

(10) Patent No.: US 11,490,259 B2
(45) Date of Patent: Nov. 1, 2022

(54) SYSTEM AND METHODS FOR VERIFYING USER CONNECTIONS

(71) Applicant: Tappter Limited, Milton Keynes (GB)

(72) Inventors: Keith Banwaitt, Milton Keynes (GB); Demetrio Filocamo, London (GB)

(73) Assignee: Tappter Limited, Keynes (GB)

( * ) Notice: Subject to any disclaimer, the term of this patent is extended or adjusted under 35 U.S.C. 154(b) by 0 days.

(21) Appl. No.: 17/264,415

(22) PCT Filed: Jul. 22, 2019

(86) PCT No.: PCT/EP2019/069699
§ 371 (c)(1),
(2) Date: Jan. 29, 2021

(87) PCT Pub. No.: WO2020/025384
PCT Pub. Date: Feb. 6, 2020

(65) Prior Publication Data
US 2022/0116785 A1 Apr. 14, 2022

(30) Foreign Application Priority Data
Jul. 30, 2018 (GB) ..................................... 1812389

(51) Int. Cl.
*H04W 12/50* (2021.01)
*H04W 4/21* (2018.01)
(Continued)

(52) U.S. Cl.
CPC ........... *H04W 12/50* (2021.01); *H04W 4/023* (2013.01); *H04W 4/06* (2013.01); *H04W 4/21* (2018.02); *H04W 12/63* (2021.01); *H04W 4/80* (2018.02)

(58) Field of Classification Search
CPC ... H04L 67/14; H04L 65/4076; H04L 67/141; H04L 69/14; H04L 61/1541;
(Continued)

(56) References Cited

U.S. PATENT DOCUMENTS 8,700,710 B1 4/2014 Gallagher
10,075,539 B1 * 9/2018 Sabur ...................... H04L 67/16
(Continued)

FOREIGN PATENT DOCUMENTS

WO 20110154956 A1 12/2011

OTHER PUBLICATIONS

International Search Report, PCT/EP2019/069699, dated Oct. 14, 2019.

*Primary Examiner* — Kwasi Karikari
(74) *Attorney, Agent, or Firm* — Invention To Patent Services; Alex Hobson

(57) ABSTRACT

A system and method for verifying user interactions is disclosed. User profiles are associated with mobile devices 12. The mobile devices have data network connection means (e.g. a WiFi or mobile data connection to the internet). The data network connection may be subject to the availability of external infrastructure and is not therefore constantly available. The mobile devices also have short-range direct broadcast communication means (for example Bluetooth® radios). The short-range direct broadcast communication means does not rely on external infrastructure and therefore direct broadcast communication can be made from one device to another as long as the two devices are close enough together. The system and method allows a connection to be verified between two users who are physically in the same place, whether or not the users' devices both have a current data network connection.

17 Claims, 2 Drawing Sheets

(51) Int. Cl.
*H04W 12/63* (2021.01)
*H04W 4/02* (2018.01)
*H04W 4/06* (2009.01)
*H04W 4/80* (2018.01)

(58) Field of Classification Search
CPC . H04L 63/0823; H04L 63/083; H04L 63/102; H04L 65/1069; H04L 47/14; H04L 67/306; H04L 67/30; H04L 67/303; H04W 4/80; H04W 12/50; H04W 12/04; H04W 12/06; H04W 12/08; H04W 4/70; H04W 12/0431; H04W 4/02; H04W 8/005; H04W 8/24; H04W 36/0011; H04W 76/10; H04W 12/03; H04W 12/041; H04W 12/068; H04W 12/086; H04W 12/102; H04W 12/12; H04W 12/77; H04W 36/36; H04W 4/40; H04W 84/005; H04W 8/14; H04W 8/22; G06F 3/04883; G06F 3/017; G06F 3/03547; G06F 21/00; G06F 3/147; H04M 1/72412; H04M 15/7652; H04M 1/00
See application file for complete search history.

(56) References Cited

U.S. PATENT DOCUMENTS

| | | |
|---|---|---|
| 2006/0234631 A1 | 10/2006 | Dieguez |
| 2013/0185654 A1* | 7/2013 | Harris .................. H04W 76/10 715/753 |
| 2014/0123214 A1* | 5/2014 | Black .................. H04L 63/083 726/1 |
| 2015/0373091 A1 | 12/2015 | Sanghavi |
| 2017/0272522 A1* | 9/2017 | Moldsvor .............. H04L 67/18 |
| 2018/0288599 A1* | 10/2018 | Zhao .................... H04W 76/14 |

* cited by examiner

SYSTEM AND METHODS FOR VERIFYING USER CONNECTIONS

The present invention relates to verifying a connection/interaction between users, where each user has a device, particularly where each user has a mobile device such as a mobile smartphone.

BACKGROUND OF THE INVENTION

There are various scenarios in which a deliberate interaction or connection between two users needs to be verified. For example it is common in social networking websites for a 'connection' to be established between users where a first user requests to 'connect' with a second user, and the second user is then invited to accept or reject that connection. Where a first user requests a connection and the second user accepts, the fact that the users have deliberately both agreed to connect to each other is verified. In a social networking example, this will typically lead to an enhanced level of access to each other's information, allowing messages to be sent back and forth, etc.

In other examples, an interaction between profiles might need to be verified, for example, at the door of a concert or other event in an "e-ticketing" system. Similarly a successful e-payment system essentially has to verify that a particular account holder wants to transfer a particular amount to a particular recipient, and the recipient wants to accept that transfer. The same general problem arises in a large number of other situations where a system needs to verify that two users each wish to connect to or interact with each other in some way.

The problem with the "request and accept" approach is that it is not necessarily quick and easy. Firstly one party has to search for the other, then make the request, and then it has to be confirmed by the other. In the social networking example, privacy concerns mean that some users are reluctant to make themselves easily searchable—if they do not want even very limited personal details such as a name and photo available to anyone they do not know. However not being "searchable" means that it is all the more problematic to actually make a connection with a person and share information, when the user wants to do that. Even two users who are physically in the same place and are talking to each other might struggle to find each other and make a connection on a social networking website if neither user is easily searchable. Also, if either user lacks internet access then it may be impossible to perform both parts of the "request/accept" protocol on the spot, since typically both users would need to be able to connect to an external server (for example the server of a social network website) to perform their side of the connection verification.

Modern mobile smartphones normally have access to the internet via various means (WiFi, mobile data, etc.) and can communicate with external servers and also with each other (data communication with other mobile devices is normally via external servers). However, access to the internet is subject to availability of network signal which is not universal. Some users may also prefer to keep mobile data turned off at least some of the time, for cost reasons, to prolong battery life, or just to avoid unwanted interruptions.

Most mobile smartphones also often have short-range Bluetooth® radios. Bluetooth® allows for short-range data communication between devices. In particular Bluetooth Low Energy (BLE) allows for short-range low-data rate communication with limited power requirements. It generally works in one of two modes—in one mode two Bluetooth devices can set up a connection between them. This connection can take some time to establish and usually involves a level of security to ensure that both devices—or the users of both devices—want to connect to each other, for example by entering codes. Once the connection is set up, two-way data communication between the two devices is possible.

The other BLE mode available is a "broadcast" mode. This is effectively a one-way unilateral broadcast of a small amount of data by a device. Other nearby devices will be able to receive the broadcast but cannot address the broadcasting device and send data back to it. One example of an application of the broadcast mode is the "iBeacon" protocol. Beacons continually transmit an identifier, and another BLE device is able to receive identifiers for beacons in its vicinity and also get a good estimate of range (i.e. distance from the receiver to the beacon). Receiving an iBeacon broadcast is a very quick process and avoids the need for any connection set-up. However, it is intrinsically a one-way communication from the broadcasting device to the receiving device.

US20090153342 discloses detecting "taps" on each of two devices. The devices communicate with each other over a data communication channel to "verify" the taps. The object is to verify a deliberate attempt to "pair" or "connect" the two devices.

US2011191823 similarly seeks to verify an intention to establish a connection between two users/devices. Each device sends a "status report" to an external server which includes the time and location when an intention to establish a connection was indicated.

It is an object of the present invention to provide a seamless means of verifying an intention to establish a connection between two user profiles, which avoids the overhead of setting up a two-way connection between two devices and also avoids the need for external data network (internet) access at least at the time when the users are engaged in carrying out the necessary steps.

SUMMARY OF THE INVENTION

According to the present invention, there is provided a method of verifying a connection between at least two user profiles by a handshake, each user profile being associated with a mobile device, and each mobile device having at least means for connecting to a data network and means for short-range direct broadcast communication with the other device(s), the method comprising the steps of:
a first device receiving an input to initiate the handshake, and in response to the input, broadcasting by the short-range direct broadcast communication means of the first device at least:
an indication that a handshake has been initiated; and
an identifier for a first user profile associated with the first device,
a second device broadcasting by the short-range direct broadcast communication means of the second device at least:
an indication that a handshake has been initiated; and
an identifier for a second user profile associated with the second device,
the first device receiving the broadcast from the second device and the second device receiving the broadcast from the first device,
and each device in response to receiving the relevant broadcast, outputting to a user associated with its respective user profile;
an indication that the broadcast has been received; and
information about the user profile associated with the other device, and each device in response to receiving an input of user confirmation that a handshake is to be completed:

sending to an external server via the data network a record of a completed handshake, including at least the identifier associated with the first user profile and the identifier associated with the second user profile, and by the external server, matching a record received from the first device with a record received from the second device, and on matching being achieved, determining that a connection between the first user profile and the second user profile has been verified.

Advantageously, where two or more users are physically present in the same location, they can quickly and easily use their devices to create a verified connection between two user profiles. This is done without the need for either user to "search" for the other, and also neither user's device necessarily needs to have access to the internet to communicate with the external server at the time of interaction. Each device needs to broadcast only an identifier for its own associated profile—the device does not need to broadcast, and at the outset does not need to know, the identifier for the profile associated with the other device(s). If necessary, the step of sending to the external server may be delayed until such time as an internet connection is available, whereas the users have already carried out all steps needed to verify the connection and each user knows that the verification has worked.

In different embodiments, a completed handshake may verify that two users or a group of users want to "connect" to each other on a social networking platform, connect to make a payment from one user to another, use an electronic ticket at an entrance to an event (i.e. to create a "connection" between the used ticket and the event entrance), etc.

A user profile may mean a range of things depending on the application. A user profile will normally be linked in some way with a person, but in some cases might be more generically linked to an organisation or role, for example a user profile for a door supervisor at an entrance to an event in an e-ticketing application. In some embodiments, a user may have more than one associated profile, for example a "personal" profile for social purposes and a "professional" profile for work purposes. The user may be able to select from multiple profiles by input means on his respective device. Also, the same overall method can be used in different contexts, for example as well as connecting in a social network, another context may be an e-ticketing application. This will in some embodiments involve the user selecting a particular "e-ticket", which amounts to a particular user profile. In some e-ticketing embodiments, the same user profile might be used for e-ticketing and for other purposes (e.g. social networks). Buying a ticket will essentially involve a transaction whereby the user profile ID of the purchasing user is put on a list of profile IDs which can be admitted to an event on a successful handshake.

The mobile device in a typical embodiment is a smartphone. Typically, the connection to a data network will be an Internet connection. The connection to a data network may be only available sporadically, for example subject to mobile data service or proximity to a WiFi network. The data network connection, when available, may allow two way communication with an external server.

The means for short-range direct broadcast communication may be in the form of a Bluetooth® radio, preferably, a BLE (Bluetooth Low Energy) radio. The direct broadcast communication may use the iBeacon standard over BLE.

Advantageously, this allows direct communication between nearby devices, without the need for any external infrastructure to be available.

In response to user input, a first device broadcasts an indication that a handshake has been initiated and an identifier for a first user profile associated with the first device. This first user profile might be the only user profile associated with the first device, or may be one of several user profiles, the relevant user profile having been selected by the user.

In a typical embodiment, exactly the same process happens on each of the first and second devices—i.e. the first device in response to input from the first user broadcasts an identifier for the first user profile, and the second device in response to input from the second user broadcasts an identifier for the second user profile. However, in some embodiments user input to initiate the process may only be needed on one device—the second device may initiate a broadcast in response to receiving a broadcast from the first device. In some embodiments, a user-initiated broadcast may carry a flag to indicate whether or not a second device should start broadcasting in response without user input from the second user to the second device.

Where there are three or more devices involved in the handshake, each one will make a broadcast and each will receive every other broadcast. A flag may be set on the broadcast to indicate that it is part of a group handshake—i.e. a handshake involving more than two devices.

In some embodiments, in addition to the indication that a handshake has been initiated and an identifier for the relevant user profile, each device may broadcast an indication as to whether it currently has a connection to a data network (typically, this means access to the Internet).

It should be noted that whilst the first device is broadcasting to the second device and the second device is receiving, and the second device is broadcasting to the first device and the first device is receiving, the communications are connectionless and essentially unacknowledged—there are a pair of one way messages rather than a true two-way communication between the two devices.

When a device is in a state where a handshake has been initiated (i.e. it is broadcasting its message—the message contains at least an indication that the handshake has been initiated and a profile identifier, and may contain other components), then in response to receiving a relevant broadcast from another device it will output an indication that the broadcast has been received and information about the user profile associated with the other device. The nature of this information may depend on whether both devices have a current data network connection. If neither device has a data network connection, then the information about the user profile associated with the other device will in most cases have to be limited to whatever identifier has been transmitted. In some embodiments, it is preferred in these circumstances to display a combination of the two user profile identifiers which are involved in a handshake. In many embodiments, the user profile identifier is likely to be, for example, just a number or another identifier which is essentially meaningless on its own, but which uniquely identifies a user in a database. By combining the two user profile identifiers, the output on each user's device can be identical, and by each user checking that the number displayed is the same as the other user's, each user can be confident that they are "handshaking" with the right person.

An example of a combination, in an embodiment where the user profile IDs are integers, is taking the three least significant digits of each user profile ID and concatenating them, starting with the smallest three digit number. For example, when there is one user profile ID 2536973 and a second user profile ID 2570982 the combination may be 973982. Each device will display the number 973982 on its display (or other output means) and each user will be prompted to check that both devices are displaying the same code. Although the code as such is meaningless to the users, by using a combination of the two profile IDs the devices can ensure that they display the same code, and the users by checking that both devices are indeed displaying the same code are assured that the correct handshake is taking place—i.e. they are "handshaking" with each other and not with other users in the vicinity whose devices may be in range.

If both devices have a data network connection, then it will be possible in some embodiments for each device to use the received user profile identifier to look up information in a database, for example to output the name of the person with whom a handshake is taking place. This likewise gives the user confidence that they are handshaking with the correct person, and results in a more intuitive interface when the data network connection is available.

If one device has a data network connection and the other does not, then the device that does have a data network connection may be able to display more data. However, it is preferred to prominently display the same code, being a combination of the two user profile identifiers, on both devices, and to solicit user confirmation that the right handshake is being made primarily based on this identical number/string being output on each device.

Preferably, each device is able to estimate the range of a received broadcast, i.e. the physical distance between it and the broadcasting device. In some embodiments, only a broadcast received from another device less than a threshold distance away will be counted. As an example, the threshold might be a few metres, for example three metres. This requires the two users to be physically close together and avoids interference and confusion from other users in the vicinity, who may also have devices configured as part of the same system.

Overall, the invention allows two or more users, in the same physical location and who are able to collaborate for example by talking to each other, to quickly and easily "connect" their user profiles. There may be other users who are part of the same system in the vicinity, but by taking account the estimated range of the received one-way broadcasts interference is reduced, and by displaying information relating to the other user profile ID and requiring a user confirmation, accidental "handshakes" with unrelated persons are completely avoided.

According to a second aspect of the invention, there is provided the system of claim 10. Preferable/optional features of the second aspect of the invention are set out in claims 11 to 17.

DESCRIPTION OF THE DRAWINGS

For a better understanding of the present invention, and to show more clearly how it may be carried into effect, a preferred embodiment will now be described with reference to the accompanying drawings in which.

DESCRIPTION OF THE EMBODIMENTS

Figure 1:
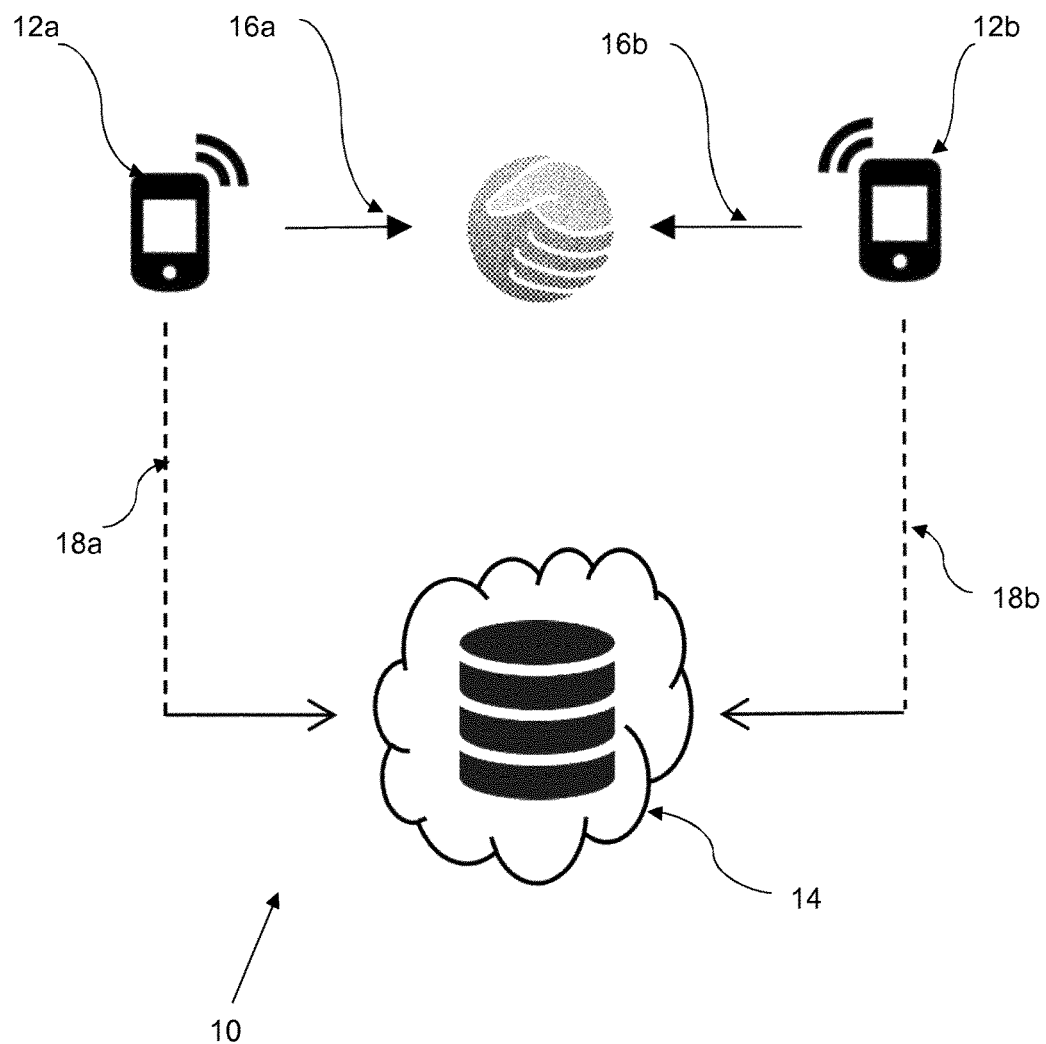
FIG. 1 is a schematic of a system including two mobile devices and a server for use with the method of the invention.

Referring firstly to FIG. 1, a system for verifying a user interaction is generally indicated at 10. The system includes portable devices 12a and 12b, both of which are mobile smartphones. For simplicity, just two devices are shown in the drawings and it is these two devices which interact with each other in the examples. However, it will be appreciated that there may be many devices in the system, any two (or more) of which can "handshake" with each other at any time. Various features of the invention allow users to be sure that they are "handshaking" with the correct other device(s), as described in more detail below.

The system also includes a server 14. The server may of course in some embodiments be a cluster of computers, or a virtual server, or any other suitable type of server.

Each of the portable devices 12a, 12b includes at least a short-range communication means, in this example a Bluetooth® Low Energy (BLE) radio. In particular, each of the portable devices is capable, via a combination of hardware and software, of making a broadcast communication in accordance with the iBeacon standard. Each of the portable devices is also capable of receiving such a broadcast. The BLE radio allows direct communication between the portable devices 12a, 12b, as long as they are in range of each other, without the need for any external infrastructure.

Messages broadcast by the short-range communication means are essentially one-way and unacknowledged. The messages are indicated in the schematic of FIG. 1 at 16a, 16b and include at least a user profile identifier and an indication that a handshake is initiated.

Each of the portable devices 12a, 12b includes a data network connection means, typically a connection to the internet. This data network connection means is used to allow each device to communicate with the server 14, as indicated at 18a, 18b in the FIG. 1 schematic.

The data network connection means may be for example a WiFi transceiver or a mobile data network transceiver. In some cases, the same Bluetooth radio may be used for this function as for the direct short-range communication means, but in this case the Bluetooth radio would connect to another device at short range, which in turn allows data network access.

It will be appreciated that, whatever the exact system for data network access, external infrastructure is relied upon. Data network access may therefore not be available in some areas. In contrast, the short-range direct communication via Bluetooth does not rely on external infrastructure and therefore in principle should always be possible between two devices which are sufficiently close together.

Figure 2:
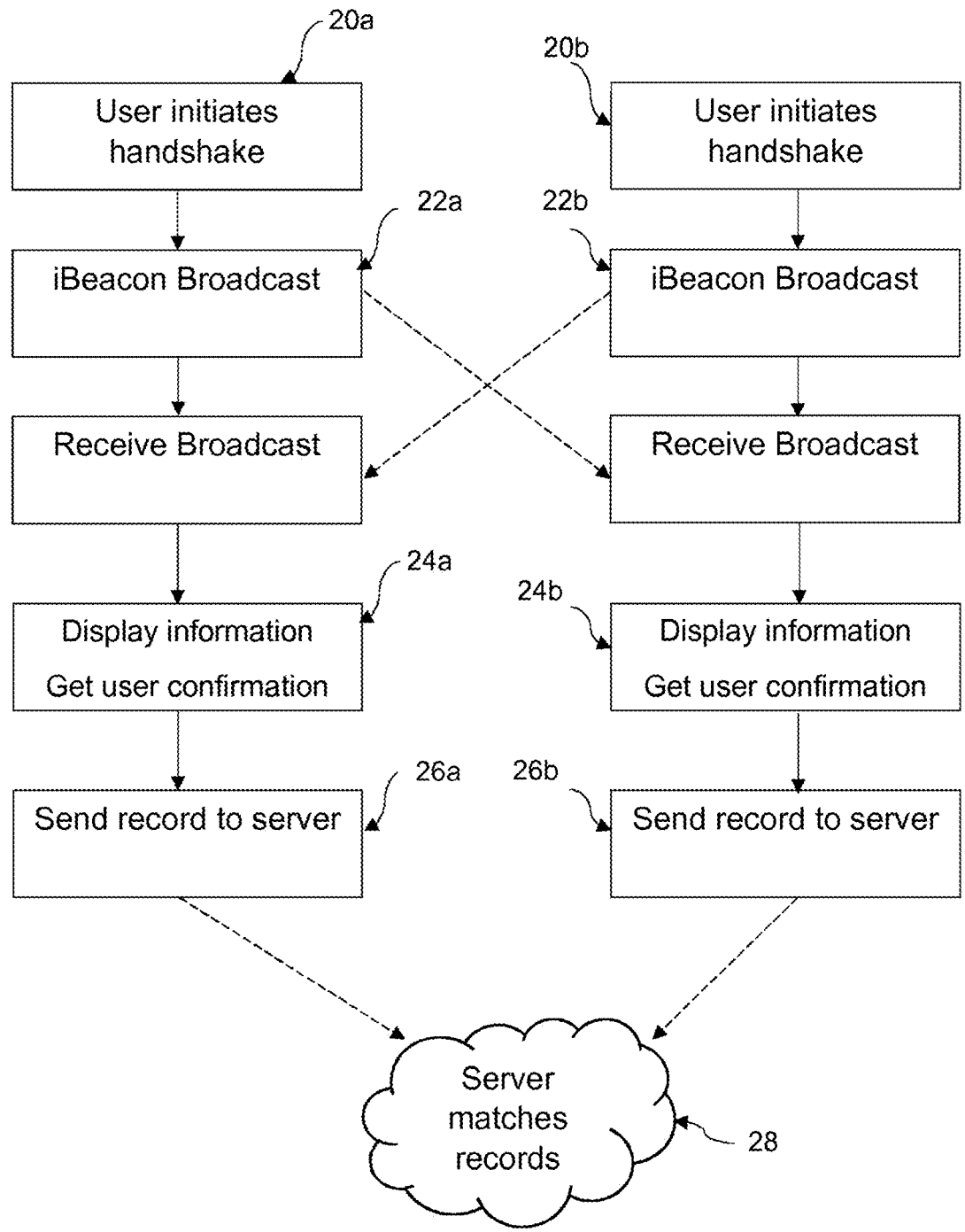
FIG. 2 is a flowchart showing the steps of the method of the invention.

With reference to FIG. 2, one embodiment of the method of the invention will now be explained in more detail. The left hand side of FIG. 2 shows the steps carried out by a first device (12a) and the right hand side of FIG. 2 shows the steps carried out by a second device (12b).

In this example, the users of the first and second devices (12a, 12b) wish to "connect" to each other, for example to become "friends" on a social networking website, share contact details, make a payment, or verify another application-specific action. The users are physically close together and can collaborate for example by talking to each other.

At step 20a, 20b each user initiates a handshake. In a simplest embodiment the user simply presses a button (or a "virtual button" on a touchscreen interface) to start the process. Other ways of initiating the process are possible and in particular a "tap" or "bump" as described in US20090153342 might be one possibility. In any case, what is important is that each user provides some form of user input to initiate the handshake.

The user inputs at steps 20a, 20b are unlikely to be exactly synchronised in time—inevitably one user input will usually come before the other. However, bearing in mind that the users are physically close together and can talk to each other and see what each other is doing, it is easily achievable in most cases for them to provide the user input within a few seconds of one another.

In response to the user input, each device broadcasts a message on its short-range broadcast communication means—for example on its BLE radio. This is shown at step 22a, 22b. The "broadcast" or "advertisement" is not directed or addressed to any particular other device. Typically, the broadcast may make use of the iBeacon standard which is a connectionless, unaddressed and inherently one-way communication means.

In most embodiments, it is envisaged that the broadcast will be sent for a limited period of time, for example for 5 seconds. This time period should be enough to ensure that, although user inputs are unlikely to be completely synchronized, two users who are trying to initiate a handshake at about the same time are likely to cause their devices to broadcast to each other for an overlap of at least 1 or 2 seconds. The time period during which a device is listening for broadcasts from others may be the same as the time period during which the device itself is broadcasting, or a different time period may be used. In some embodiments, some devices may be configured to always listen for broadcasts.

Limiting the time period during which a broadcast is made helps to ensure that there is limited confusion from other devices in the area which may also be configured to allow handshaking as part of the system.

The broadcast made by each device comprises at least an indication that a handshake has been initiated, and an identifier for a user profile associated with the device. Preferably, the broadcast also includes an indication as to whether the device has current data network access.

A broadcast using the iBeacon standard includes a UUID and "Major & Minor values". In one implementation, a particular UUID is used to indicate that a handshake is being sought, and to distinguish the broadcast from other users of the iBeacon standard who may be unconnected to the method of the invention.

Two iBeacon UUIDs could be used with the particular UUID being selected based on whether or not the broadcasting device has current data network access. As an example:

Broadcasting UUID 16CBEC1F-CA17-4F95-8D67-0127CB329010 could indicate that a handshake has been initiated and that the broadcasting device has a current working internet connection.

Broadcasting UUID 16CBEC1F-CA17-4F95-8D67-0127CB329011 could indicate that a handshake has been initiated but that the broadcasting device does not have a current working internet connection.

In some embodiments, more than two UUIDs may be used to distinguish different handshake types, for example a particular UUID or set of UUIDs could distinguish a group handshake (i.e. a handshake intended to connect more than two users). Different UUIDs could also indicate handshakes for the purposes of different follow-on actions, for example a set of UUIDS for contact sharing, a set of UUIDs for payment verification, etc.

That leaves the major and minor values to be used to broadcast an identifier for the user profile associated with the broadcasting device. In the iBeacon standard, each of the major and minor values is an unsigned integer in the range 0 to 65535. Between the two values therefore, it is possible to transmit a 32 bit profile identifier, which in most systems will be more than enough to provide the required number of user profiles.

In addition to the information broadcast, on receipt of the broadcast the receiver can estimate the range of the broadcasting device, i.e. the physical distance between the two devices. In some embodiments, broadcasts may be ignored if the range estimate is greater than a threshold, for example, greater than 3 metres. The method of the invention is designed to work when two or more users are physically in the same place and are actually talking/collaborating, so three metres is in fact further apart than the users will generally be, just to allow for any possible error in the range estimate.

Ignoring broadcasts further away than a range threshold serves to avoid confusion/interference from other nearby devices which may be part of the same system, and attempting to handshake with each other. Three metres has been found to be a good threshold distance for a two-user handshake. Where more users are involved in a handshake the threshold may be greater. In most embodiments, a user will select on his device whether it is a two-user handshake or a multiple-user (group) handshake on initiation of the handshake.

Each device then displays information relating to the user profile of the other device. This is shown at step 24a, 25b on FIG. 2. The way this is done may depend on whether or not both devices have a current internet connection, and this is why the internet connection status of each device is preferably sent as part of the broadcast.

Preferably this information is output by displaying it on a screen of the mobile device.

Where both devices have an internet connection, the other user's profile ID may be used to retrieve basic information, for example a name, from an online service. Each device can then display a friendly message, for example:

"You are trying to handshake with Paul Jones. Press OK to confirm, or Cancel."

The user presumably knows whether the person he or she is trying to handshake with is Paul Jones, and so can very easily determine that the process is working correctly, and press OK to confirm. Likewise, since both devices have an internet connection, a friendly message with the user's name will appear on Paul Jones' device.

If either device does not have an internet connection, then it will not be possible to retrieve this information using the profile ID. The profile ID itself could be displayed, but this is likely to be essentially meaningless to the user and so would not serve as a good verification that the right handshake is being made. Instead, the preferred embodiment creates a verification code from the combination of both profile IDs, and displays the same verification code on both handsets. As an example, the verification code could just be the three least significant digits of one profile ID and the three least significant digits of the other profile ID, concatenated together starting with whichever integer value is lower. For example, where one user profile ID is 2536973 and a second user profile ID is 2570982 the combination may be 973982.

In this example, both devices will then display a message similar to:

"You are attempting to handshake in offline mode. Please check that the following security code matches with the other user and press OK to confirm or Cancel—973982".

The users can then physically check that both devices are displaying the same code. Although the number itself is essentially meaningless, since both users are in the same place they can easily check, for example by holding their screens next to each other, that both mobile devices are displaying the same code. If they are, then this provides a very good assurance that the correct handshake, between the correct two users/devices, is taking place.

Assuming that the user confirms the handshake—either by checking for an identical code in offline mode or by checking that the name that they expect appears in online mode—the device (that is, the device on which the user has confirmed) records a record of a successful handshake. The absolute minimum for this record is simply a record that a successful handshake took place together with the counterparty profile ID and the local user's profile ID as well. However it is preferred also to store the time of the handshake. The record is sent to the server at step 26a. Note that this process takes place on both devices, assuming that both users confirm the handshake, and so the server will receive two messages sent at steps 26a, 26b.

Note that steps 26a, 26b might take place some time after steps 24a, 24b, in the case where one of the devices does not have current internet access. Where a device is offline, the record will be stored locally on the device until a network connection becomes available.

At step 28, the server matches the two records received. Two messages must be received—one from each device—before the server will determine that a successful handshake between two user profiles has taken place. Preferably, the server will also take account of the timestamp on the records—for example requiring the two records to have a recorded time of a successful handshake of no more than for example a minute apart. Since clocks on most mobile smartphones are usually synchronised automatically to an external source, a threshold time difference of an even shorter period may be acceptable, for example a few tens of seconds.

Although the process has been described primarily with reference to a pair of users, it is also envisaged that the method could be used for a "group handshake" between multiple users. A "group" handshake is essentially the same as multiple two-way handshakes, although there may be differences to some details. For example, where a group handshake is envisaged, the threshold for the maximum distance of the counterparty device might be increased, for example from 3 metres (for a two-way handshake) to 5 metres (for a group handshake). Aspects of the user interface on each device may also be modified, essentially to allow users to perform multiple handshakes in parallel with ease.

The method of the invention may be used to achieve various end results, for example to verify a payment in an e-payments system or to verify admission to an event in a e-ticketing context. In this case, the "user profile" may have a broader meaning than some information about a user as such. For example, in an e-ticketing context, the profile ID may in effect be a ticket ID for one user (the customer/ticketholder) and the profile ID may relate to a particular event, or even a particular entrance to a particular event, for the other user (the door supervisor).

The invention allows a deliberate interaction to be verified between two users, for a range of purposes. It is not dependent on contemporaneous availability of a network connection on either device.

It will be understood that the embodiments described are by way of example only, and variations and modifications are within the scope of the invention. The invention is defined by the claims.

We claim:

1. A method of verifying a connection between at least two user profiles by a handshake, each user profile being associated with a mobile device, and each mobile device having at least means for connecting to a data network and means, separate from the data network, for short-range direct connectionless and unaddressed broadcast communication with the other device(s), the method comprising the steps of:
a first device receiving an input to initiate a handshake, and in response to the input, broadcasting by the short-range direct connectionless and unaddressed broadcast communication means of the first device a broadcast including at least:
an indication that a handshake has been initiated; and
an identifier for a first user profile associated with the first device,
a second device broadcasting by the short-range direct connectionless and unaddressed broadcast communication means of the second device a broadcast including at least:
an indication that a handshake has been initiated; and
an identifier for a second user profile associated with the second device,
the first device receiving the broadcast from the second device and the second device receiving the broadcast from the first device,
and each device in response to receiving the relevant broadcast, outputting to a user associated with its respective user profile:
an indication that the broadcast has been received; and
information about the user profile associated with the other device,
and each device in response to receiving an input of user confirmation that a handshake is to be completed:
sending to an external server via the data network a record of a completed handshake, including at least the identifier associated with the first user profile and the identifier associated with the second user profile,
and by the external server, matching a record received from the first device with a record received from the second device, and on matching being achieved, determining that a connection between the first user profile and the second user profile has been verified.

2. The method of verifying a connection as claimed in claim 1, in which the short-range direct connectionless and unaddressed broadcast communication means is a Bluetooth (RTM) radio.

3. The method of verifying a connection as claimed in claim 1, in which the second device receives an input to initiate the handshake, and in response to the input, initiates a broadcast by the short-range direct connectionless and unaddressed broadcast communication means.

4. The method of verifying a connection as claimed in claim 1, in which the broadcast made by each device includes an indication as to whether the respective device currently has a connection to a data network.

5. The method of verifying a connection as claimed in claim 4, in which the information about the user profile associated with the other device which is outputted by each device is dependent on whether or not both or all devices currently have a connection to a data network.

6. The method of verifying a connection as claimed in claim 5, in which each device in response to receiving the respective broadcast(s) outputs a code which is a combination of components of the user profile identifiers associated with both or all devices, if at least one device currently does not have a connection to a data network.

7. The method of verifying a connection as claimed in claim 5, in which each device uses the data network connection means to retrieve and display information about the user profile associated with the other device(s), if all devices currently have a connection to a data network.

8. The method of verifying a connection as claimed in claim 1, in which the short-range direct connectionless and unaddressed broadcast communication means of each device provides an estimate of the range of a received broadcast, and each device is configured to ignore received broadcasts with an estimated range greater than a predetermined threshold.

9. The method of verifying a connection as claimed in claim 8, in which the predetermined range threshold is 3 metres.

10. A system for verifying a connection between at least two user profiles by a handshake, the system including:
at least two mobile devices, each mobile device having at least one associated user profile, and each mobile device having at least means for connecting to a data network and means, separate from the data network, for short-range direct connectionless and unaddressed broadcast communication with the other device(s);
an external server, the mobile devices each being able to communicate with the external server via the means for connecting to a data network,
and each device being adapted to:
receive a user input to initiate a handshake, and in response to the input, broadcast by the short-range direct connectionless and unaddressed broadcast communication means a broadcast including at least:
an indication that a handshake has been initiated; and
an identifier for the or a selected user profile associated with the broadcasting device,
receive a similar broadcast from another device and in response to receiving the relevant broadcast, output a broadcast including:
an indication that the broadcast has been received; and
information about the user profile associated with the other device,
receive an input of user confirmation that the handshake is to be completed, and in response to the input:
send to an external server via the data network a record of a completed handshake, including at least the identifiers associated with each user profile being connected in the handshake,
and the external server being adapted to match records received from mobile devices, and on matching records received from all mobile devices in a handshake, determining that a connection between the user profiles has been verified.

11. The system as claimed in claim 10, in which the short-range direct connectionless and unaddressed broadcast communication means is a Bluetooth (RTM) radio.

12. The system as claimed in claim 10, in which the broadcast made by each device includes an indication as to whether the respective device currently has a connection to a data network.

13. The system as claimed in claim 12, in which the mobile devices are adapted to determine the information output about the user profile associated with the other device based on whether or not both or all devices currently have a data network connection.

14. The system as claimed in claim 13, in which each mobile device is configured to output a code which is a combination of components of the user profile identifiers associated with both or all devices, if at least one device currently does not have a connection to a data network.

15. The system as claimed in claim 13, in which each mobile device is configured to retrieve via the data network connection and display information about the user profile associated with the other device(s), if all devices currently have a connection to a data network.

16. The system as claimed in claim 10, in which the short-range direct connectionless and unaddressed broadcast communication means of each device provides an estimate of the range of a received broadcast, and each device is configured to ignore received broadcasts with an estimated range greater than a predetermined threshold.

17. The system as claimed in claim 16, in which the predetermined threshold is 3 metres.

* * * * *